United States Patent [19]

Hones et al.

[11] Patent Number: 5,256,071
[45] Date of Patent: Oct. 26, 1993

[54] MULTIPLE-COLLISION ACCELERATOR ASSEMBLY

[76] Inventors: Edward W. Hones, 129 Monte Rey Dr., Los Alamos, N. Mex. 87544; William G. Hones, 17953 Marine View Dr., Seattle, Wash. 98166; Stirling A. Colgate, 422 Estante Way, Los Alamos, N. Mex. 87544

[21] Appl. No.: 748,804

[22] Filed: Aug. 22, 1991

[51] Int. Cl.$^5$ .............................................. G09B 23/08
[52] U.S. Cl. ................................. 434/302; 434/300; 446/168; 446/486
[58] Field of Search ................ 434/300, 302; 446/486, 446/168; 124/1

[56] References Cited

U.S. PATENT DOCUMENTS

| D. 216,999 | 3/1970 | Kanbar . | |
|---|---|---|---|
| D. 217,912 | 6/1970 | Trippett . | |
| 3,002,294 | 10/1961 | Jackson . | |
| 3,744,472 | 7/1973 | O'Ryan . | |
| 5,046,984 | 9/1991 | Cane | 434/302 X |

Primary Examiner—Richard J. Apley
Assistant Examiner—Karen Ann Jalbert

[57] ABSTRACT

A device comprising several highly elastic objects is presented whose purpose is to demonstrate an unobvious consequence of fundamental laws of physics—the acceleration of an object to high speed by multiple collisions among a series of heavier objects moving at slower speed. The objects, each of different mass, are arrayed in close proximity in order of decreasing mass with their centers lying along a straight line. This arrangement of the assembly of objects is maintained by a constraining element which permits the assembly axis to be oriented in any desired direction and permits the assembly to be moved or manipulated as a unit in any desired way without destroying the arrangement of objects. In the preferred embodiment the elastic objects are polybutadiene balls (12), the constraining element is an interior guide-pin (10) fastened in the largest ball and extending radially therefrom, on which the remaining balls can slide freely because of diametrical holes formed in them. In use this multiple-collision accelerator assembly is suspended in vertical orientation, with the largest ball downward, by holding the tip-end of the guide-pin which extends beyond the littlest ball. The assembly is then dropped onto a solid surface (14), the striking of which produces a sharp impulse that is transmitted from the largest ball, through the assembly, causing the littlest ball to be projected to a height many times that from which the assembly was dropped.

7 Claims, 4 Drawing Sheets

MULTIPLE-COLLISION ACCELERATOR ASSEMBLY

BACKGROUND

1. Field of Invention

This invention generally relates to the acceleration of an object to high velocity by means of successive elastic collisions among an assembly of lower-velocity objects of higher mass, which are kept in linear array, prior to the initiation of the collisions, by a restraining device that permits the axis of the array to be oriented in any desired direction and that allows the assembly of objects to be handled and manipulated as a unit.

2. Cross-Reference to Related Applications

A patent application (Ser. No. 07/713,261, filing date Jun. 11, 1991) entitled "Multiple-Collision Acceleration Demonstrator and Toy," submitted by E. W. Hones, S. A. Colgate and W. G. Hones, also relates generally to acceleration of an object to high velocity by means of successive elastic collisions among an alignment of lower-velocity objects of higher mass. But that invention has the objects suspended in a horizontal line from horizontal supports, with no constraining device, such as in the present application, that allows the assembly of objects to be used as a unit in a vertical alignment or other orientation.

3. Description of Prior Art

The act of accelerating an object to high velocity and/or projecting it long distances or to great heights or with directional precision is a perennial source of human satisfaction, amusement and recreation, and is the basis for most of the countless "ball games" such as baseball, golf, billiards, tennis, etc. In nearly all such cases the object is accelerated by collision with another object and the outcome of the collision is determined by two basic laws of physics—the law of the conservation of energy and the law of the conservation of momentum. A special form of such collisions is found in bouncing objects off a wall, as in handball and racquet ball or off the ground or the floor in games such as basketball or jacks. In these examples the collision occurs between the ball and an object regarded to have infinite mass and still the consequences of the collision obey the two conservation laws mentioned above. The conservation laws tell us that the rebound speed depends on the elastic properties of the ball-surface combination and can range from near zero to very nearly the full speed of impact but it cannot equal or exceed the speed of impact.

The invention described here is yet another "ball game"—one that involves not just a single collision but that, in its preferred embodiment, utilizes a collision, first, between the ground or floor and a constrained linear array of balls, and then multiple collisions among the balls themselves. The device demonstrates a remarkable consequence of the conservation laws— that, unlike the bouncing of a single ball off the ground or floor in which the bounce speed is always less than the impact speed, the bounce speed of the lightest ball of the linear assembly can be many times the impact speed. The principal of the invention is illustrated in FIG. 1 which shows a series of highly elastic balls (for example steel or polybutadiene) of progressively diminishing size constrained, by a guide-pin through their centers, to lie along a straight line. The guide-pin is fastened in the largest ball while the remaining balls are free to slide along the pin, which, when the balls are all in contact, extends a short distance above the smallest ball. The array is dropped, large ball down. Upon impact with the ground or floor, the impulse is transmitted through the balls giving the smallest ball a high upward velocity which carries it to a large height, much greater than the height to which any of the balls would bounce if dropped singly. The theoretical basis of the invention is further elaborated below.

A patentability search has yielded no prior art against which this invention actually infringes. U.S. Pat. No. 3,002,294 to Jackson (1961), U.S. Patent Des. 217,912 to Trippett (1970) and U.S. Patent Des. 216,999 to Kanbar (1970) are all versions of the long-familiar toy or demonstration device which has a horizontal alignment of suspended steel balls, all of equal mass. Pulling back and releasing one or more balls at one end of the line produces a series of impacts that causes the same number of balls from the other end of the line to rise to approximately the same height to which the first balls were raised. These patents do not address the much different results that are obtained with balls of unequal masses.

U.S. Pat. No. 3,744,472 to O'Ryan (1973) shows a series of two or more "resilient balls" of decreasing size in a vertical array, the largest at the bottom and the smallest at the top, each ball having a socket at its top to receive the ball above. Imparting an upward blow to the bottom ball (as by kicking) causes the smallest ball to depart upward with substantial velocity. That patent describes the balls only in terms of their sizes and "resilience," with no mention made of their weights nor of an important quantity, the coefficient of restitution, which will be defined later in our specification. Thus O'Ryan's "Multiple-Ball and Projectile Toy" is not specified in meaningful, clear, concise, or exact physical terms that would enable a skilled person to produce it. Furthermore, although the O'Ryan device involves transmission of an upward impulse through multiple collisions, it has no constraint that would keep the several balls in linear array if they were to be dropped to impact the ground as in the present invention.

OBJECTS AND ADVANTAGES

The objects and advantages of the present invention are:

(a) to provide a demonstration of consequences of the laws of conservation of energy and conservation of momentum;

(b) to demonstrate that these laws, operating in multiple collisions of highly elastic objects, permit the transformation of the kinetic energy of a heavy, slow-moving object into high velocity of a lighter object;

(c) to provide a constraint on the relative positions of the objects so that the entire assembly can be handled as a unit, oriented at will, moved about and, as in the use described here, dropped to provide an impact with a solid surface such as a floor, a pavement or the ground;

(d) to minimize the frictional energy losses to the constraint by using an interior guide-pin as the constraint in the preferred embodiment rather than an exterior housing;

(e) To embody all of these features in a toy for educational entertainment and amusement.

DRAWING FIGURES

Figure 1:
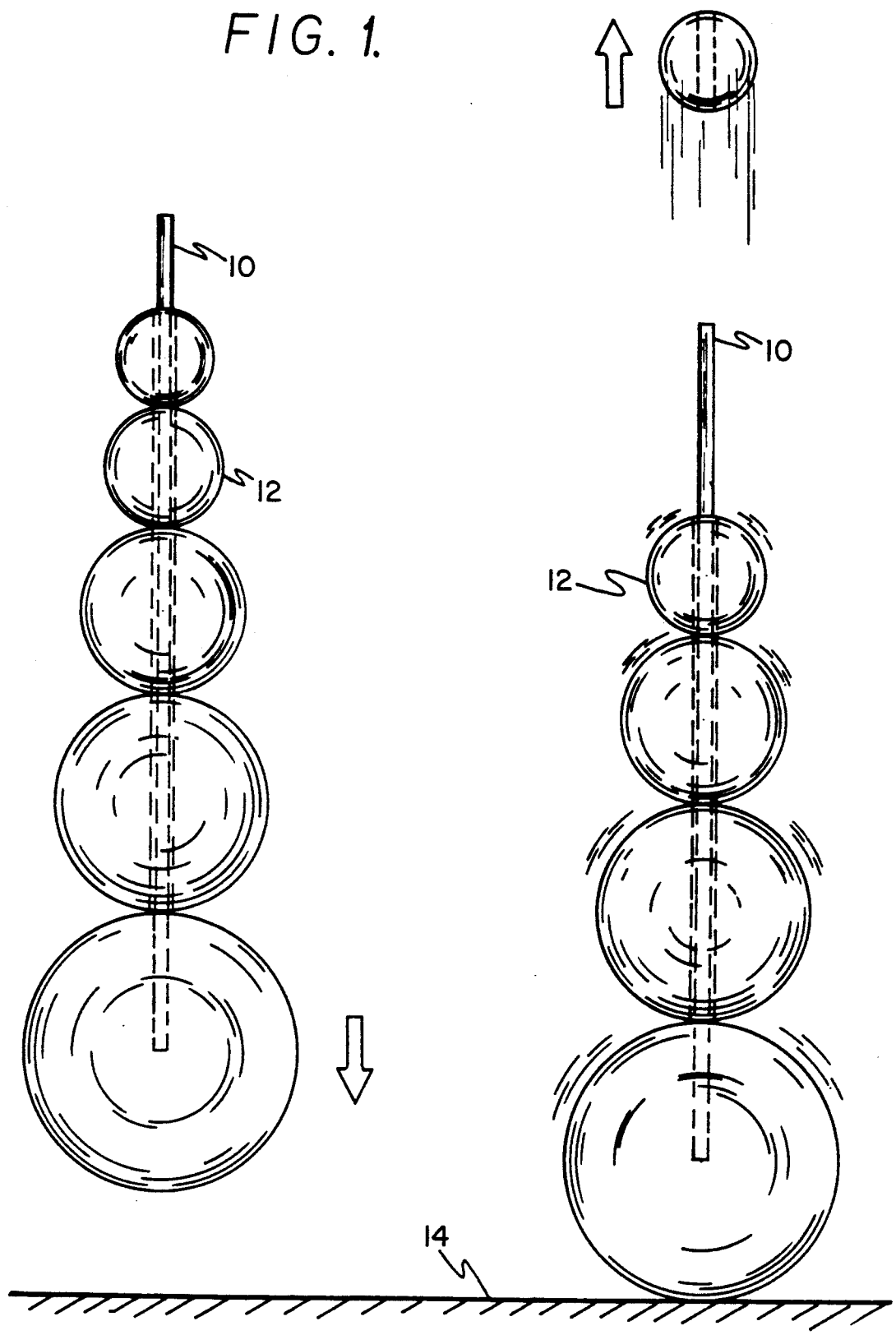
FIG. 1 is a sketch illustrating the behavior of the invention when it impacts a horizontal hard surface in vertical orientation with the large ball down.

REFERENCE NUMERALS IN DRAWINGS 10 guide-pin
12 ball of highly elastic material
14 solid horizontal surface

THEORY OF THE INVENTION

FIG. 1 illustrates the basic functioning of the invention under the laws of conservation of energy and conservation of momentum. A number of highly elastic objects, which we represent as spherical balls, are arrayed with their centers of mass in a straight line. The masses of the objects decrease monotonically from the heaviest at one end of the line to the lightest at the other end such that the ratio, f (which we call the mass decrement), of the mass of one object to that of the next smaller one is less than one. For the sake of this discussion we will let the mass decrement be the same for each pair of balls so that if the total mass ratio, $m_H/m_L$ of the heaviest to the lightest ball is R, then for a system of n balls:

$$f = R^{-(\frac{1}{n-1})} \tag{1}$$

The straight alignment of the balls is maintained by a guide-pin which is fastened into the heaviest ball and along which the remaining balls can slip easily because of holes, somewhat bigger than the pin diameter, formed along their diameters. The guide-pin is long enough to extend a short distance beyond the smallest ball. In the embodiment of the invention described here the balls are solid polybutadiene spheres (superballs) although other shapes and materials could be used and the number of objects could be other than 5.

When an elastic sphere (sphere a), moving with an initial velocity, $U_a$ strikes another elastic sphere (sphere b) which is initially at rest ($U_b=O$) along their line of centers, the final velocities, $V_a$ and $V_b$ of spheres a and b, dictated by the laws of conservation of energy and momentum are:

$$V_a = \left(\frac{1-ef}{1+f}\right) U_a \tag{2}$$

$$V_b = \left(\frac{1+e}{1+f}\right) U_a \tag{3}$$

Here f is the mass ratio, $m_b/m_a$. e is the coefficient of restitution, defined by the equation $$e = \frac{V_b - V_a}{U_a - U_b} \tag{4}$$

e is a positive fraction, less than 1, and is a measure of the elasticity of a pair of colliding objects. For highly elastic materials e is very nearly 1 while for plastic substances such as clay it is nearly zero. In a system of several colliding spheres, as in FIG. 1, where e and f are non-varying from collision to collision, the equation (3) can be applied successively to each collision in the series such that the four collisions among the five balls give the fifth (lightest) ball a velocity:

$$V_L = \left(\frac{1+e}{1+f}\right)^4 U_H \tag{5}$$

where $U_H$ is the initial velocity of the heaviest ball.

When the system of balls is dropped from a height, $h_{sys}$ above the impact surface it strikes the surface with a velocity $$U_{sys} = \sqrt{2 g h_{sys}} \tag{6}$$

where g is the acceleration of gravity (32 ft/sec$^2$). The velocity $U_H$ to be used in equation (5) is the velocity in the rest frame of the moving system of balls that is given the largest ball by its impact with the surface. This is obtained by applying equation (3) to that impact. Imagine the balls to be stationary and the surface, having infinite mass, to strike the largest ball with velocity $U_a = U_{sys}$. In this picture f=O and taking the coefficient of restitution between the surface and the large ball to be $e_s$, equation (3) gives $$U_H = (1+e_s) U_{sys} \tag{7}$$

So, in the rest frame of the system of balls $$V_L = U_{sys}(1 + e_s)\left(\frac{1+e}{1+f}\right)^4 \tag{8}$$

But in the observer's (stationary) frame of reference the velocity $V_L$ is smaller than this by the amount $U_{sys}$. So the velocity, $V_L$ in the observer's frame is given by:

$$V_L = U_{sys}\left[(1 + e_s)\left(\frac{1+e}{1+f}\right)^4 - 1\right] \tag{9}$$

The height to which the lightest ball will rebound is then given by $$h_L = \left(\frac{V_L}{U_{sys}}\right)^2 h_{sys} \tag{10}$$

Figure 2A:
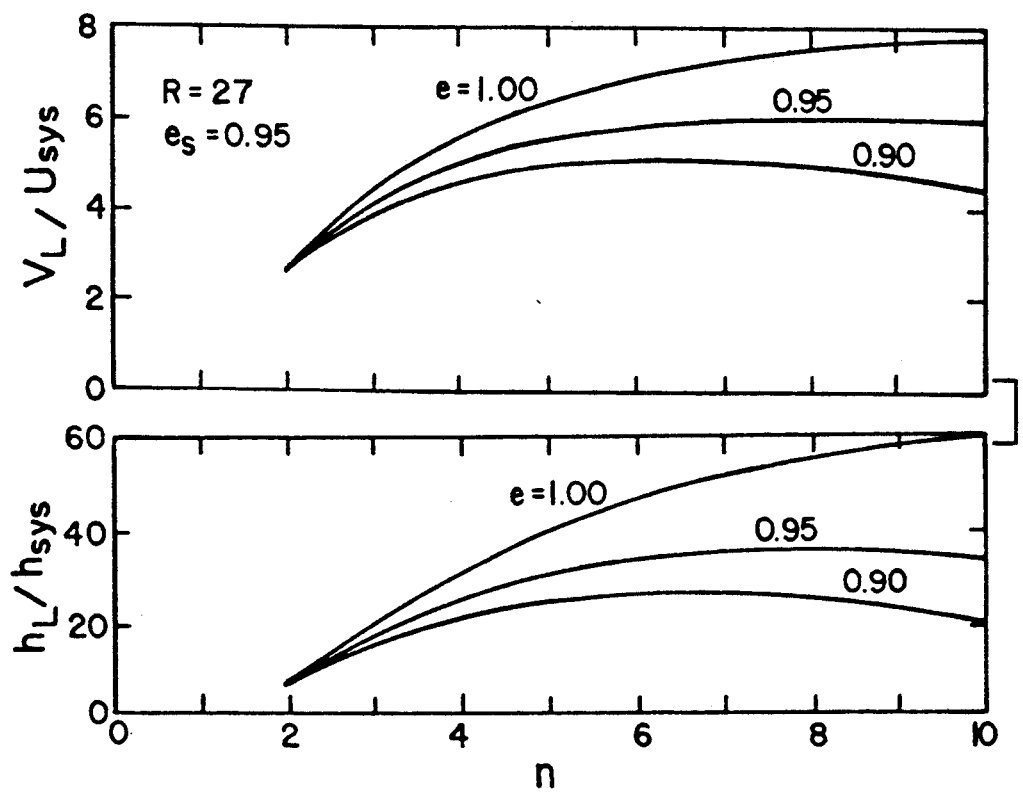
FIGS. 2A and 2B show final-to-initial velocity ratios and final-to-initial height ratios for initial-to-final mass ratios of 27 and 64.
Figure 2B:
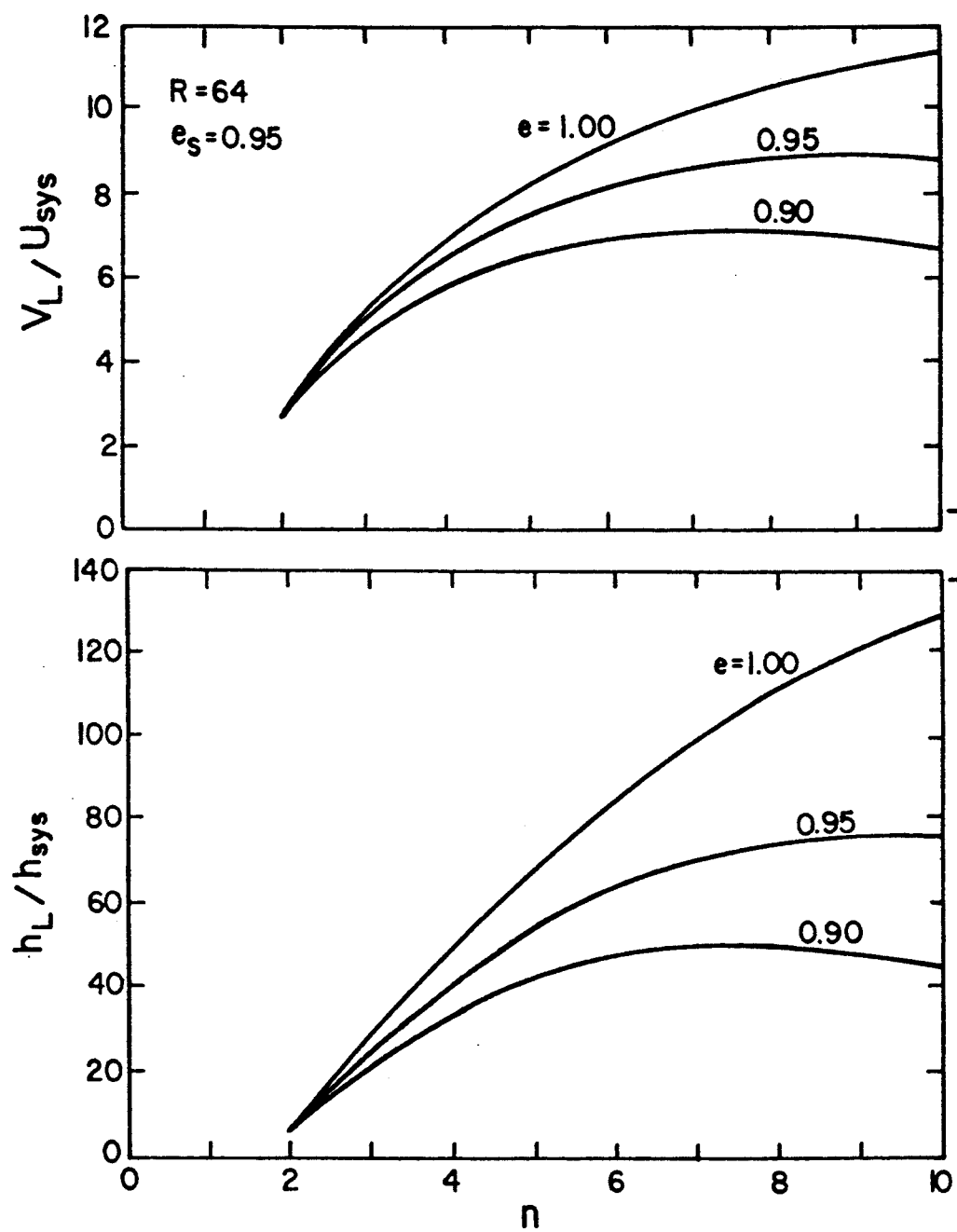

FIGS. 2A and 2B show the velocity ratios $V_L/U_{sys}$ and the height ratios $h_L/h_{sys}$ as a function of the number, n, of balls for three values of e, for a single value, 0.95, of $e_s$ and for two different total mass ratios, R=27 and R=64. First, the curves show that larger total mass ratios provide greater velocity ratios and height ratios. But, for a given R, these ratios increase strongly with the number of balls, illustrating the important fact which this invention demonstrates—that the high speed is achieved through multiplicity of collisions. Decreasing values of e reduce the velocity and height ratios. For our preferred embodiment we have chosen five polybutadiene balls (e about 0.95) with a total mass ratio, R, of 27 which give $V_L/U_{sys}=5.6$ and $h_L/h_{sys}=31$.

Figure 3:
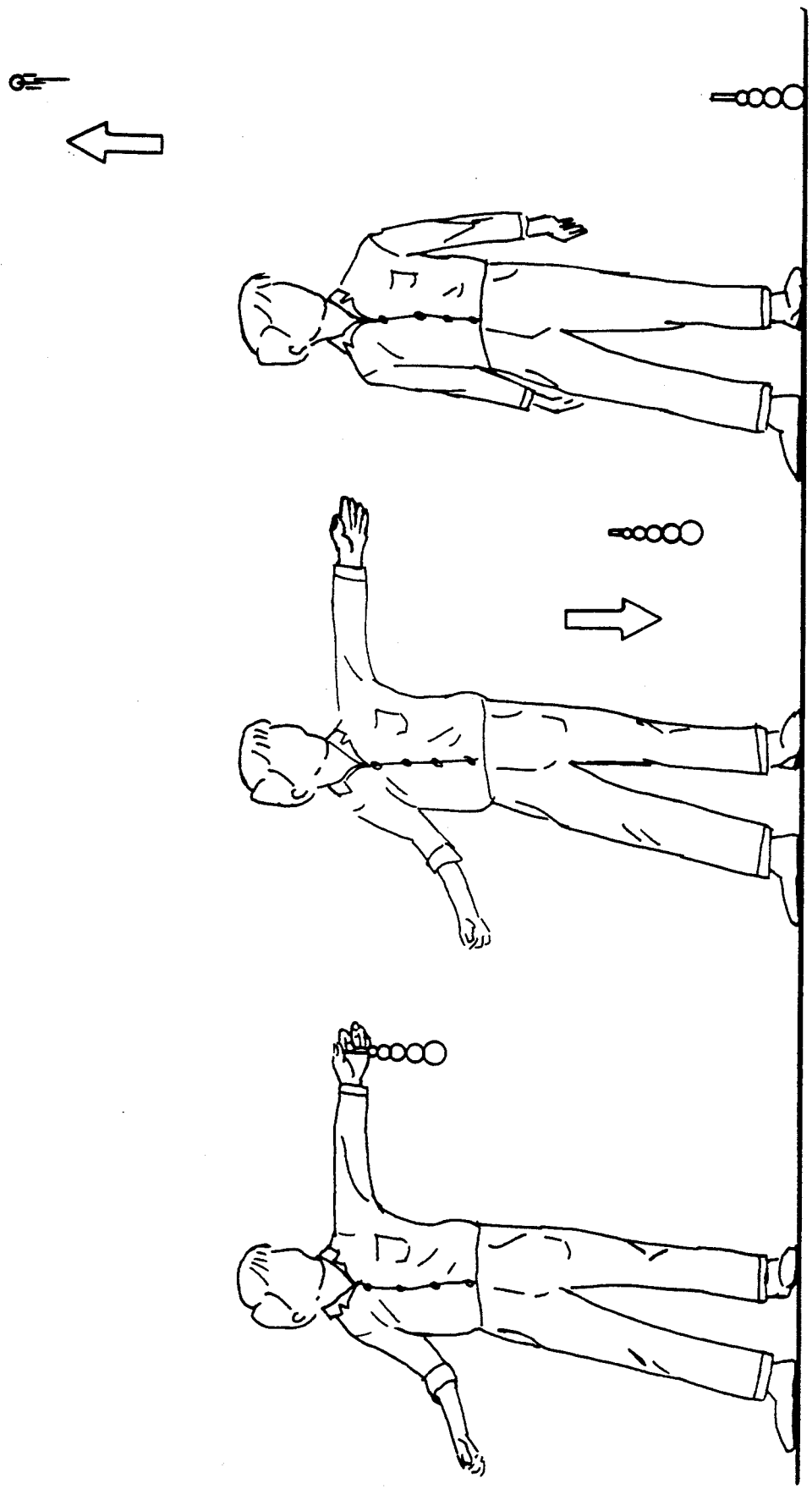
FIG. 3 illustrates how one would use the invention holding the tip of the guide-pin between thumb and index finger and dropping the assembly in vertical orientation onto a hard horizontal surface.

Operation - FIG. 3

The preferred embodiment of the invention is shown in FIG. 1. Five polybutadiene balls (tradename superballs) (12) are arrayed with their centers in straight alignment and with the balls in light contact. The balls are kept in this straight alignment by a guide-pin (10) which is fastened in the largest ball, extending radially therefrom. The other four balls are arrayed along the guide-pin by means of holes formed along their diameters, these holes being large enough so the balls slide freely on the guide-pin. The guide-pin extends beyond the smallest ball by a distance that is great enough that the tip of the guide-pin can be easily grasped between a person's thumb and forefinger.

The manner of using the invention is as sketched in FIG. 3. The system of balls is held by the tip of the guide-pin thus allowing the assembly to hang vertically. The system is then dropped by simply releasing the guide-pin's tip. When the assembly strikes the floor or ground in nearly vertical orientation the impulse given the largest ball is transmitted very rapidly through the line of balls so that the lightest ball receives a large fraction of the total kinetic energy of the ball assembly and is projected upward at high speed, reaching heights many times greater than the height from which the assembly was dropped.

Summary, Ramifications and Scope

The reader will see that the invention described here has aspects both of an instrument for demonstrating consequences of fundamental laws of nature—the laws of conservation of energy and of conservation of momentum—and of a toy or device for entertainment and amusement. Both as a demonstration and as an amusement device it finds its appeal in the unexpectedness or unobviousness of the fact that the little ball rebounds to a height many times that from which the assembly is dropped (about 30 times as high for the embodiment presented here). This is quite unlike the commonly anticipated behavior of bouncing objects.

The scope of the invention should not be considered limited by the specificities of the above description; these simply provide an illustration of the functioning of the invention in its presently preferred embodiment. For example, instead of dropping the device to provide the impulse, the impulse could be applied to the large ball by a blow from an object such as a mallet or some manner of projectile. For such other possible uses the ball alignment need not be vertical since the constraint of the assembly keeps the balls aligned for the acceleration process to work in other orientations as well.

Thus the scope of the invention should be determined by the appended claim and its legal equivalent, rather than by the example given.

We claim:

1. A multiple-collision accelerator assembly comprising a series of at least three objects of highly elastic material, each of a different mass, said objects being in contact with each other or in close proximity with their centers of mass arrayed in a straight line, the heaviest object at one end of the line of centers, said heaviest object having an arcuate surface defining an end portion of said assembly, the least heavy object at the other end of the line of centers with the masses decreasing monotonically from the heaviest object to the least heavy object, the arrangement of said assembly being maintained by a constraining element consisting of a guide-pin fixedly attached within the heaviest object, passing through holes in the remaining objects, which are freely slidable on said guide-pin, and extending a substantial distance beyond the least heavy of said objects.

2. A multiple-collision accelerator assembly according to claim 1 wherein said highly elastic objects are substantially spherically shaped.

3. A multiple-collision accelerator assembly according to claim 1 wherein said guide-pin is a straight cylindrical rod of small diameter fixedly attached within the heaviest of said objects and extending outward from said heaviest object along a radius of aid heaviest object.

4. A multiple-collision accelerator assembly according to claim 2 wherein each of said highly elastic objects except the heaviest has a hole extending fully along its diameter, said hole having a diameter slightly greater than the diameter of said guide-pin.

5. A multiple-collision accelerator assembly according to claim 1 wherein each of said highly elastic objects except the heaviest said object is freely slidable on said guide-pin.

6. A multiple-collision accelerator assembly according to claim 1 wherein said guide-pin extends substantially beyond the least heavy of said highly elastic objects when all of said highly elastic objects are aligned upon said guide-pin, each in contact with an adjacent object.

7. A multiple-collision accelerator assembly comprising three or more highly elastic balls, all of different mass, within the heaviest of which is fixedly attached a guide-pin that extends radially outward from the heaviest ball and upon which the remaining balls are aligned in order of decreasing mass by virtue of a hole along a diameter of each ball, said guide-pin, when all of said remaining balls are aligned upon it an din contact with each other, extending substantially beyond the least heavy ball to provide a gripping area that can be held by finger tips to support said assembly in a vertically hanging orientation with said heaviest ball in the bottom position and said least heavy ball in the top position, and wherein upon said assembly's achieving said vertical orientation, said gripping area is released allowing said assembly to fall freely under the force of gravity and to impact the ground or floor, said impact causing the top ball to rebound upward off the guide-pin with a velocity of magnitude greater than that of said impact of said assembly with the ground or floor.

* * * * *